(12) United States Patent
Kim et al.

(10) Patent No.: US 9,125,137 B2
(45) Date of Patent: Sep. 1, 2015

(54) METHOD AND TERMINAL FOR APPLYING AN EXTENDED ACCESS BARRING

(71) Applicant: LG Electronics Inc., Seoul (KR)

(72) Inventors: Jae Hyun Kim, Seoul (KR); Hyun Sook Kim, Seoul (KR); Lae Young Kim, Seoul (KR); Tae Hyeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 119 days.

(21) Appl. No.: 13/950,453

(22) Filed: Jul. 25, 2013

(65) Prior Publication Data

US 2014/0029530 A1    Jan. 30, 2014

Related U.S. Application Data

(60) Provisional application No. 61/676,280, filed on Jul. 26, 2012, provisional application No. 61/679,780, filed on Aug. 6, 2012.

(51) Int. Cl.
*H04W 4/00*   (2009.01)
*H04W 48/10*  (2009.01)
*H04W 48/02*  (2009.01)

(52) U.S. Cl.
CPC .............. *H04W 48/10* (2013.01); *H04W 48/02* (2013.01)

(58) Field of Classification Search
CPC .................................................. H04W 76/021
See application file for complete search history.

(56) References Cited

U.S. PATENT DOCUMENTS

| 2010/0099402 A1* | 4/2010 | Wu ............................... 455/423 |
| 2012/0218889 A1* | 8/2012 | Watfa et al. .................... 370/230 |
| 2012/0281566 A1* | 11/2012 | Pelletier et al. ............... 370/252 |
| 2012/0287851 A1* | 11/2012 | Lee ................................ 370/328 |
| 2013/0040597 A1* | 2/2013 | Jang et al. ................... 455/404.1 |
| 2013/0040605 A1* | 2/2013 | Zhang et al. ................... 455/411 |
| 2013/0044702 A1* | 2/2013 | Jayaraman et al. ........... 370/329 |
| 2013/0045706 A1* | 2/2013 | Hsu ............................. 455/404.1 |
| 2013/0095863 A1* | 4/2013 | Dhanda et al. ................. 455/458 |
| 2013/0203399 A1* | 8/2013 | Gupta ........................... 455/418 |
| 2013/0336218 A1* | 12/2013 | Gupta ........................... 370/328 |

\* cited by examiner

*Primary Examiner* — Gregory Sefcheck
*Assistant Examiner* — Jael Ulysse
(74) *Attorney, Agent, or Firm* — Morgan, Lewis & Bockius LLP

(57) ABSTRACT

Disclosed is a method for applying an extended access barring (EAB), the method performed by a machine type communication (MTC) device and comprising: recognizing, by an upper layer of the MTC device, a change from being operated in an override low priority to being operated in a low priority; informing, by the upper layer, a lower layer that the priority has been changed; and determining, by the lower layer, whether to apply the EAB, to handle at least one of an attach request, a tracking area update request, and a service request. If the EAB is applied, a RRC connection is barred.

10 Claims, 13 Drawing Sheets

METHOD AND TERMINAL FOR APPLYING AN EXTENDED ACCESS BARRING

CROSS-REFERENCE TO RELATED APPLICATIONS

This application claims the benefit of priority of U.S. Provisional application No. 61/676,280 filed on Jul. 26, 2012, and No. 61/679,780 filed on Aug. 6, 2012, all of which are incorporated by reference in their entirety herein.

TECHNICAL FIELD

The present invention relates to a method and terminal for applying an extended access barring (EAB).

BACKGROUND ART

In order to meet a variety of forums and new technologies related to the 4th generation mobile communications, the 3rd Generation Partnership Project (3GPP) which aims to provide technical specifications of the 3rd generation mobile communications system has proceeded with research for the Long Term Evolution/System Architecture Evolution (LTE/SAE) technologies since year-end 2004 as a part of efforts to optimize and enhance performances of the 3GPP technologies.

The SAE mainly led by the 3GPP SA WG2 relates to research of network technologies which aims to determine a network structure together with the LTE work of the 3GPP TSG RAN and to support mobility between networks of different versions. Recently, the SAE has been considered one of the essential standardization issues of the 3GPP. Such work is to develop the 3GPP to be a system based on the IP and supporting a variety of radio (wireless) connection technologies, and has progressed with the aim of an optimized packet-based system capable of minimizing a transmission delay with enhanced data transmission capability.

The SAE upper level reference model defined by the 3GPP SA WG2 may include a non-roaming case and roaming cases with a variety of scenarios. Detailed descriptions thereof are given in 3GPP TS 23.400a and TS 23.400b. FIG. 1 is a schematic reconfiguration diagram of such network structure.

FIG. 1 is view of an evolved mobile communication network.

One of the distinctive characteristics of the network structure shown in FIG. 1 is that it is based on a 2 tier model having an eNode B of the Evolved UTRAN and a gateway of the core network. The eNode B 20 has a similar function, although not exactly the same, to the eNode B and RNC of the existing UMTS system, and the gateway has a function similar to the SGSN/GGSN of the existing system.

Another distinctive characteristic is that different interfaces are exchanged by the control plane and the user plane between the access system and the core network. While an Iu interface exists between the RNC and SGSN in the existing UMTS system, two separate interfaces, i.e., S1-MME and S1-U, are used in the Evolved Packet Core (SAE) system since the Mobility Management Entity (MME) 51 which handles the processing of a control signal is structured to be separated from the gateway (GW).

For the GW, there are two types of gateways: a Serving Gateway (hereinafter, 'S-GW') 52 and a Packet Data Network gateway (hereinafter, 'PDN-GW' or 'P-GW') 53.

FIG. 2 shows the structure and communication process of an MTC device.

A Machine Type Communication (MTC) device may be used in a mobile communication system. The MTC refers to data communications between machines performed without human interference, and a device used for these communications is referred to as an MTC device. A service provided by the MTC device is different from a communication service performed with human interference, and may be applied to a variety of services.

The aforementioned MTC device is a communication device is a communication device that performs communication between machines, which is not much different from a UE that needs human interaction, except that it needs no human interaction. That is, the MTC device may correspond to a UE that needs no human interaction. However, from the viewpoint that no human interaction is needed, if a message transmission/reception method (e.g., paging message transmission/reception method) for a UE that needs human interaction is fully applied to the MTC device, some problems may occur.

Referring to FIG. 2, when a measuring service, a road information service, a user electronic equipment calibration service, or the like, provided by the MTC device, received by an eNB, the eNB may transmit it to an MTC server, and therefore the MTC user may use the service.

It is often the case that the MTC device performs communication alone in a place that needs no human interference since it performs communication without human interaction.

FIG. 3 shows an exemplary structure of a radio interface protocol in a control plane between the UE and the base station, and FIG. 4 shows an exemplary structure of a radio interface protocol in a user plane between the UE and the base station.

The radio interface protocols are based on the 3GPP radio access network standards. The radio interface protocol has horizontal layers comprising a physical layer, a data link layer, and a network layer, and has vertical planes comprising a user plane (U-plane) for transmitting data information and a control plane (C-plane) for transmitting control signals (signaling).

The protocol layers can be categorized as a first layer (L1), a second layer (L2), and a third layer (L3) based on three lower layers of an open system interconnection (OSI) standard model widely known in the communication system.

The layers of the radio protocol control plane of FIG. 3 and those of the radio protocol user plane will be described as follows.

The physical layer, the first layer, provides an information transfer service by using a physical channel. The physical layer and an upper layer called a medium access control (MAC) layer are connected via a transport channel. Data is transferred between the MAC layer and the physical layer via the transport channel. Between different physical layers, namely, between a physical layer of a transmitting side and that of a receiving side, data is transferred via the physical channel.

The physical channel is composed of a number of subframes present in a time axis and a number of subcarriers present in a frequency axis. Here, a single subframe includes a plurality of symbols and a plurality of subcarriers in the time axis. A single subframe includes a plurality of resource blocks, and a single resource bock includes a plurality of symbols and a plurality of subcarriers. A single resource block is called a slot and has a length of 0.5 ms temporally. A TTI (Transmission Time Interval), a unit time during which data is transmitted, is 1 ms which corresponds to a single subframe.

Physical channels existing in the physical layers of a transmitter and a receiver include an SCH (Synchronization Channel), a PCCPCH (Primary Common Control Physical Channel), an SCCPCH (Secondary Common Control Physical Channel), a DPCH (Dedicated Physical Channel), a PICH (Paging Indicator Channel), a PRACH (Physical Random Access Channel), a PDCCH (Physical Downlink Control Channel), and a PDSCH (Physical Downlink Shared Channel).

The MAC layer, the second layer, is connected with the physical layer through a transport layer, and connected to an upper layer called a radio link control (RLC) layer via a logical channel.

A downlink transport channel for transmitting data from the network to the UE includes a broadcast channel (BCH) for transmitting system information, a paging channel (PCH) for transmitting a paging message, and a downlink shared channel (DL-SCH) for transmitting user traffic or a control message. The downlink multicast, traffic of a broadcast service, or a control message may be transmitted via the downlink SCH or a separate downlink MCH (Multicast Channel). An uplink transport channel for transmitting data from the UE to the network includes a random access channel (RACH) for transmitting an initial control message and an uplink SCH for transmitting other user traffic or a control message.

The logical channel is divided into a control channel that transmits information of the control plane and a traffic channel that transmits information of the user plane according to a type of transmitted information.

The logical channels, which are at an upper position than the transport channel and mapped to the transport channel, include a BCCH (Broadcast Channel), a PCCH (Paging Control Channel), a CCCH (Common Control Channel), an MCCH (Multicast Control Channel), an MTCH (Multicast Traffic Channel), a DCCH (Dedicated Control Channel), and the like.

An RLC (Radio Resource Control) layer, the second layer, supports reliable data transmission, guarantees quality of service (QoS) of each radio bearer (RB), and is responsible for (or handles) data transmission. In order to guarantee RB-specific QoS, the RLC has one or two independent RLC entities for each RB, and in order to support various types of QoS, the RLC layer provides three RLC modes: a TM (Transparent Mode); a UM (Unacknowledged Mode); and an AM (Acknowledged Mode).

A packet data convergence protocol (PDCP) layer, the second layer, performs a function called header compression that reduces the size of a header of an IP packet, which is relatively large and includes unnecessary control information, in order to effectively transmit the IP packet such as an IPv4 or IPv6 in a radio interface having a smaller bandwidth. Also, the PDCP layer is used to cipher data of the C-plane, e.g., an RRC message. The PCP layer also ciphers data of the U-plane.

A radio resource control (RRC) layer located at the uppermost portion of the third layer is defined only in the control plane, and controls a logical channel, a transport channel, and a physical channel in relation to configuration, reconfiguration, and the release or cancellation of radio bearers (RBs). In this case, the RBs refer to a service provided by the second layers of the radio protocol for data transmission between the UE and the E-UTRAN.

When there is an RRC connection between the RRC of the UE and the RRC layer of the wireless network, the UE is in an RRC-connected mode, or otherwise, the UE is in an idle mode.

A non-access stratum (NAS) layer positioned at an upper portion of the RRC layer performs functions such as session management, mobility management, and the like.

The NAS layer illustrated in FIG. 3 will be described in detail.

An eSM (evolved session management) that belongs to the NAS layer performs a function such as a default bearer management, a dedicated bearer management, or the like, and is responsible for (or handles) controlling to allow the UE to use a PS service in a network. Default bearer resource has characteristics in that it is allocated from a network when the UE first accesses a particular packet data network (PDN). In this case, the network allocates an IP address that may be used by the UE to allow the UE to use a data service, and also allocates QoS of a default bearer. In LTE, two types of bearers, i.e., a bearer having guaranteed bit rate (GBR) QoS characteristics that guarantee a particular band width for a data transmission and reception and a non-GBR bearer having best effort QoS characteristics without guaranteeing a bandwidth, are supported. In the case of the default bearer, the non-GBR bearer is allocated. In the case of a dedicated bearer, a bearer having the QoS characteristics of the non-GBR is allocated.

The bearer allocated to the UE by the network is called an evolved packet service (EPS) bearer, and when the network allocates the EPS bearer, the network allocates an ID. This is called an EPS bearer ID. A single EPS bearer has QoS characteristics of a maximum bit rate (MBR) or/and guaranteed bit rate (GBR).

FIG. 5 is a conceptual diagram showing a 3GPP service model for supporting MTC.

Although GSM/UMTS/EPS with the 3GPP standards for supporting MTC are defined to perform communication over a PS network, the present specification describes a method applicable to a CS network as well.

In the current technical specification, the use of an existing 3GPP bearer is suggested for the definition of the network structure. A method using a short message service (SMS) for data exchange between an MTC device and an MTC server was proposed as one of alternative solutions. The use of SMS was proposed, considering that a small amount of digital data including meter reading information and product information will be an object of an MTC application in view of the characteristics of the MTC application, by which an existing SMS method and an IMS-based SMS method can be supported.

In the current 3GPP standards, three architecture models for MTC are defined as follows: a Direct Model, an Indirect Model, a Hybrid Model, and so on. The Direct Model is a model in which an MTC application is connected directly to an UE over a 3GPP network and performs communication under the control of a 3GPP network provider. The Indirect Model includes two models: a model in which an MTC application is connected to an MTC server outside a 3GPP network to perform communication with a UE under the control of an MTC service provider; and a model in which an MTC server exists within a 3GPP network and an MTC application is connected to an UE to perform communication under the control of a 3GPP network provider. The Hybrid Model involves the co-existence of the Direct Model and Indirect Model. For example, user plane is a method of communication using the Direct Model and control plane is a method of communication using the Indirect Model.

As described above, Machine Type Communication (MTC) involves communication performed between machines, which may result in overload in some cases. For example, overload may be generated due to the following reasons:

there is a malfunctioning in the MTC server or MTC application;

an external event triggers MTC devices to attach/connect; and a large number of MTC devices are configured such that a specific program is repeatedly operated at a specific time.

FIG. 6 shows a network overload state.

As illustrated in FIG. 6, if traffic is overloaded or congested at an interface between the (e)NodeB 20 and the S-GW 52, then downlink data to the MTC device 10 or upload data from the MTC device 10 is failed to be properly transmitted.

Also, if an interface between the S-GW 52 and the PDN-GW 53 or an interface between the PDN-GW 53 and an Internet Protocol (IP) service network of the mobile communication operator is overloaded or congested, then downlink data to the MTC device 10 or upload data from the MTC device 10 is failed to be properly transmitted.

Also, when the MTC device is handed over from a cell being currently serviced to another cell, if the another cell is overloaded, then it will cause a problem of dropping the service of the MTC device.

In order to solve the foregoing problem, mobile communication operators have updated the S-GW 52 and the PDN-GW 53 having high-capacity, but it has a disadvantage of requiring very high cost. Furthermore, it has a disadvantage that the amount of transmitted or received data increases exponentially over time, and then overloaded in a short time.

DISCLOSURE OF THE INVENTION

Therefore, an object of the present invention is to provide a solution to the above-described problems.

To achieve these and other advantages and in accordance with the purpose of the present invention, as embodied and broadly described herein, there is provided a method for applying an extended access barring (EAB), the method performed by a machine type communication (MTC) device and comprising: recognizing, by an upper layer of the MTC device, a change from being operated in an override low priority to being operated in a low priority; informing, by the upper layer, a lower layer that the priority has been changed; and determining, by the lower layer, whether to apply the EAB, to handle at least one of an attach request, a tracking area update request, and a service request. If the EAB is applied, a RRC connection is barred.

The method may further include receiving a non-access stratum (NAS) configuration Management Object (MO) including the EAB information; and receiving system information including EAB parameters, wherein the system information is broadcasted within a cell. Accordingly, in the determination, the NAS configuration MO and the EAB parameters may be considered.

The EAB parameter may include at least one of: a bitmap parameter indicating classes for which access is barred; a category parameter indicating a category of devices for which the EAB applies; and a list of Public Land Mobile Network (PLMN).

The method may further include: notifying a NAS layer of a network node that the priority has been changed; and receiving an instruction to apply the EAB from the NAS layer of the network node.

The upper layer may correspond to a NAS layer and the lower layer may correspond to a RRC layer.

To achieve these and other advantages and in accordance with the purpose of the present invention, as embodied and broadly described herein, there is also provided a method for applying an extended access barring (EAB), the method performed by a machine type communication (MTC) device and comprising: receiving a non-access stratum (NAS) configuration Management Object (MO) including the EAB information; configuring the EAB based on the received EAB information; if the EAB is configured, indicating a lower layer that the EAB applies for at least one of an attach request, a tracking area update request, and a service request, except for a case where the MTC device is configured to allow overriding EAB and receives an indication from the upper layers to override EAB.

To achieve these and other advantages and in accordance with the purpose of the present invention, as embodied and broadly described herein, there is also provided a machine type communication (MTC) device for applying an extended access barring (EAB), the MTC device comprising: a radio frequency (RF) unit configured to receive a non-access stratum (NAS) configuration Management Object (MO) including the EAB information; a processor for controlling the RF unit. The processor may configure the EAB based on the received EAB information; and if the EAB is configured, indicate a lower layer that the EAB applies for at least one of an attach request, a tracking area update request, and a service request, except for a case where the MTC device is configured to allow overriding EAB and receives an indication from the upper layers to override EAB.

MODES FOR CARRYING OUT THE PREFERRED EMBODIMENTS

Figure 1:
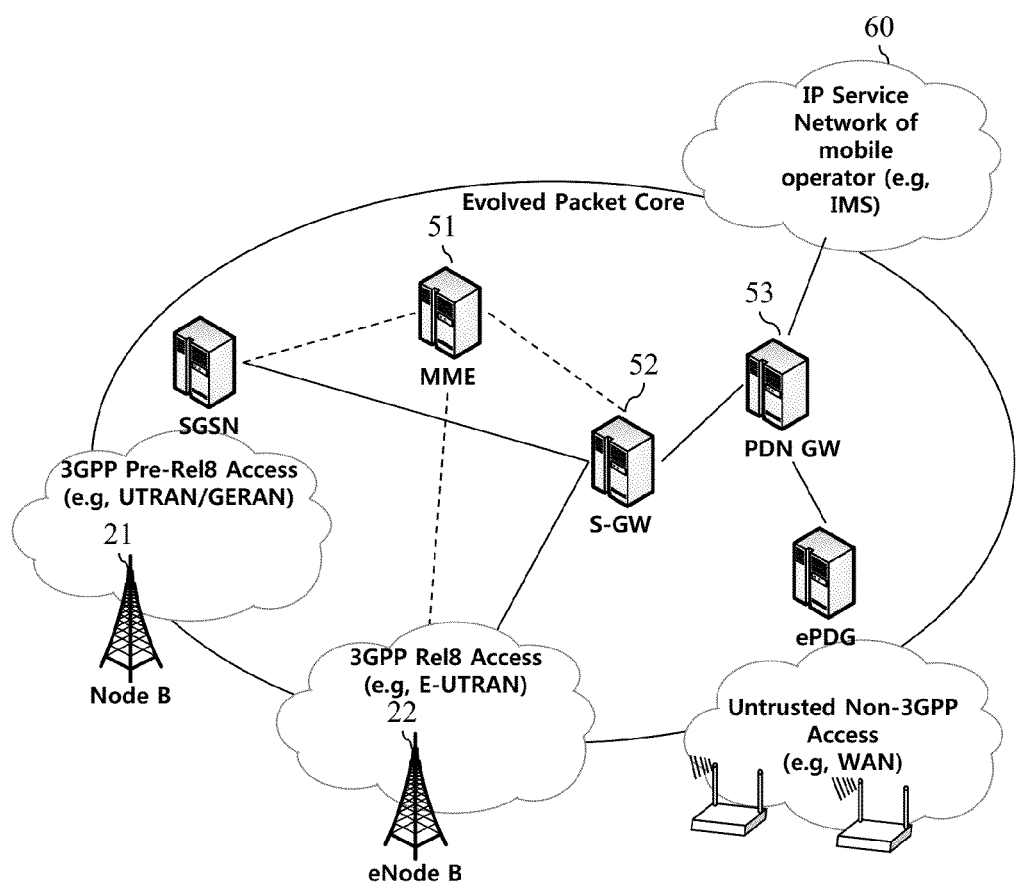
FIG. 1 is view of an evolved mobile communication network.
Figure 2:
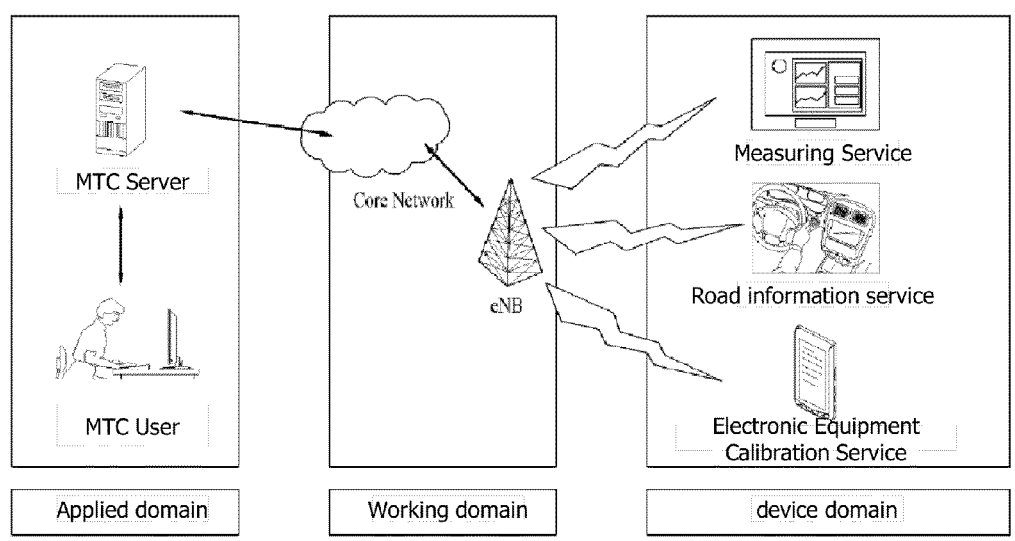
FIG. 2 shows the structure and communication process of an MTC device.
Figure 3:
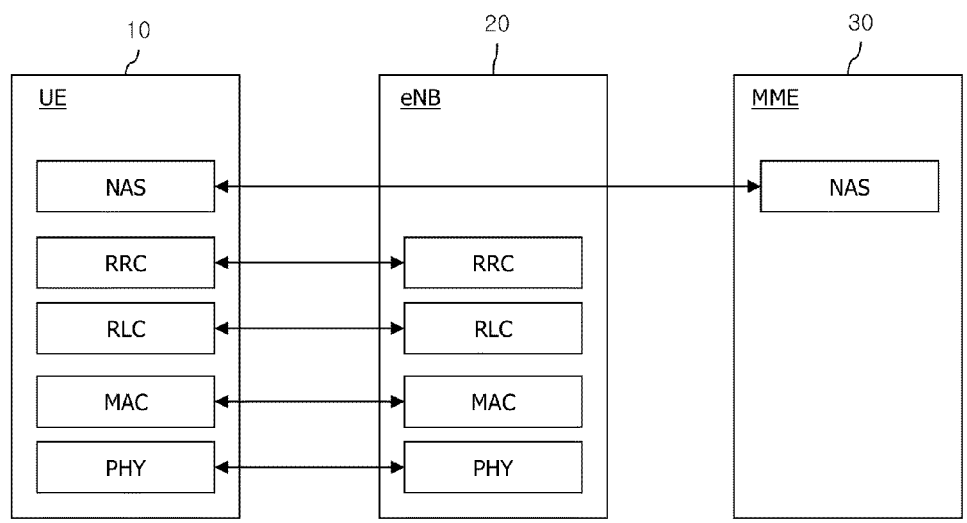
FIG. 3 shows an exemplary structure of a radio interface protocol in a control plane between the UE and the base station.
Figure 4:
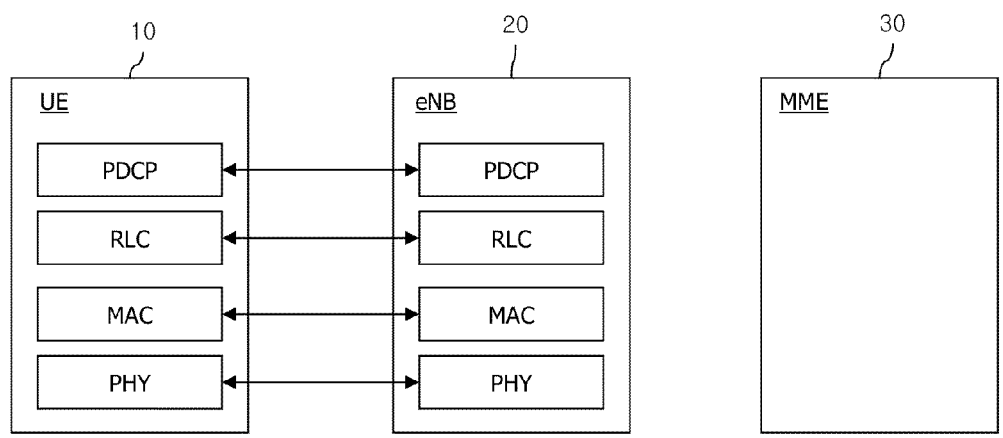
FIG. 4 shows an exemplary structure of a radio interface protocol in a user plane between the UE and the base station.
Figure 5:
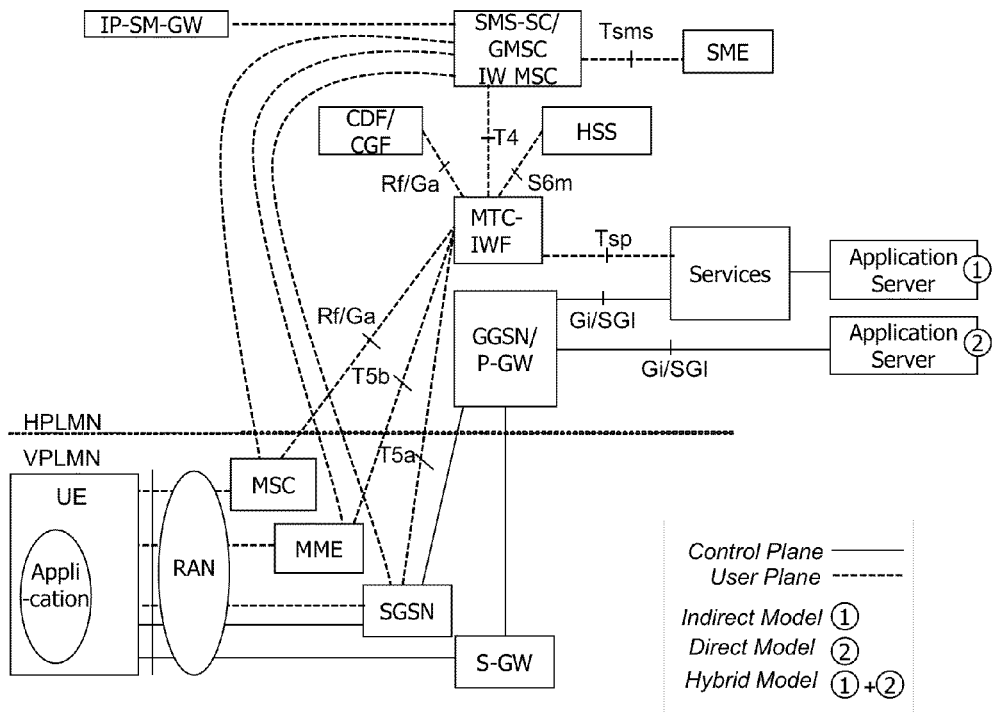
FIG. 5 is a conceptual diagram showing a 3GPP service model for supporting MTC.
Figure 5:
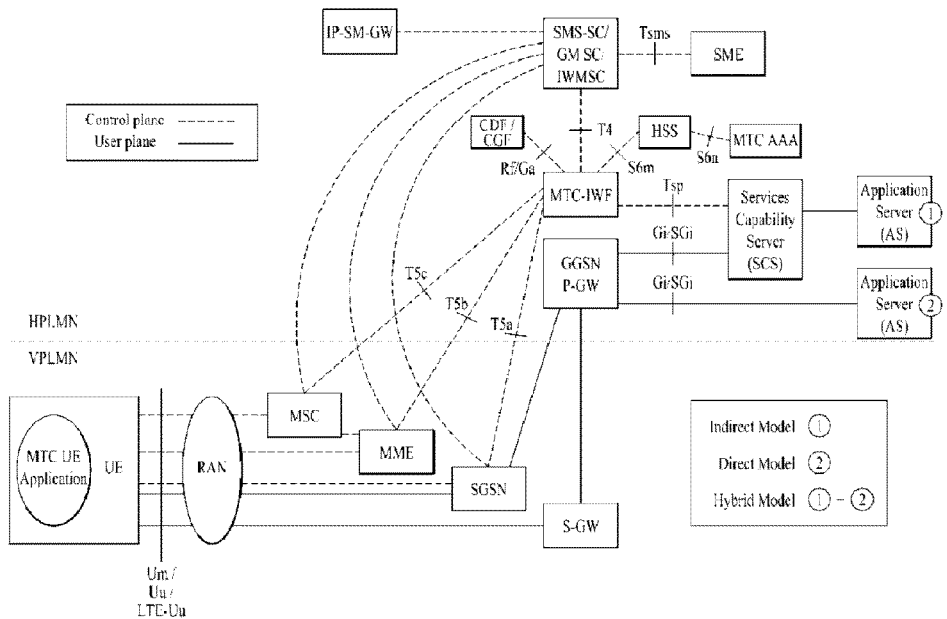
Figure 6:
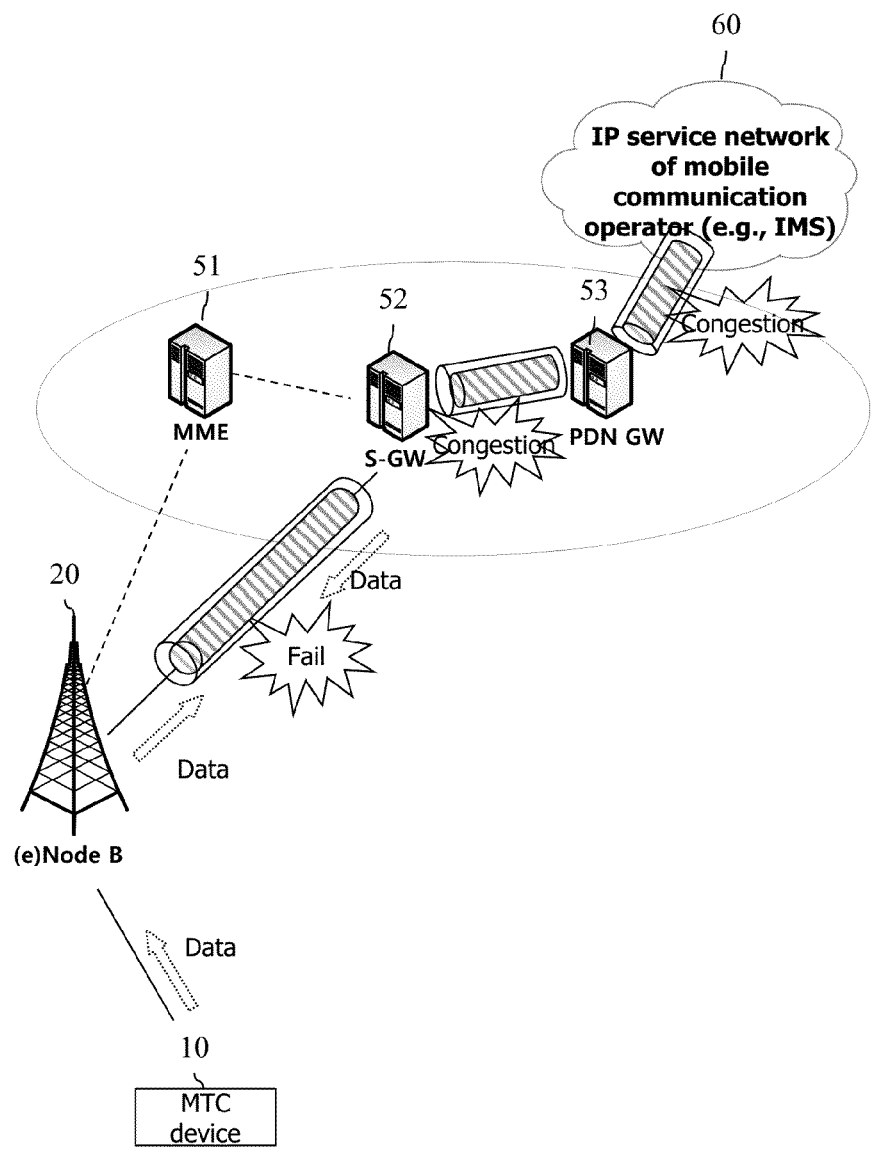
FIG. 6 shows a network overload state.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary UE (User Equipment) in accompanying drawings, however the UE may be referred to as terms such as a terminal, an ME (Mobile Equipment), etc. And, the UE may be implemented as a portable device such as a notebook, a mobile phone, a PDA, a smart phone, a multimedia device, etc, or as an unportable device such as a PC or a vehicle-mounted device.

DEFINITION OF TERMS

Hereinafter, the terms used in this specification will be briefly defined prior to describing with reference to the drawings.

UMTS: It is an abbreviation of Universal Mobile Telecommunication System and denotes the 3rd mobile communication network.

UE/MS: User Equipment/Mobile Station. It denotes a terminal device.

EPS: It is an abbreviation of Evolved Packet System, and denotes a core network supporting a Long Term Evolution (LTE) network. It is a network in the form of an evolved UMTS.

PDN (Public Data Network): An independent network in which a server providing services is located.

PDN connection: A connection from a terminal to a PDN. That is, an association (connection) between a terminal represented by an IP address and a PDN represented by an APN.

PDN-GW (Packet Data Network Gateway): A network node in an EPS network which performs the functions of UE IP address allocation, Packet screening & filtering, charging data collection.

Serving GW (Serving Gateway): A network node in an EPS network which performs the functions of mobility anchor, packet routing, idle mode packet buffering, and triggering MME to page UE.

PCRF (Policy and Charging Rule Function): A node in an EPS network which makes a policy decision to dynamically apply different QoS and charging policies for each service flow.

APN (Access Point Name): As the name of an access point managed by a network, it is provided to the UE. That is, a text string indicating or identifying a PDN. It is necessary to pass through a relevant P-GW in order to access a requested service or network (PDN). An APN denotes a name (text string) predefined within the network to find the P-GW (e.g., internet.mnc012.mcc345.gprs).

TEID (Tunnel Endpoint Identifier): An end point ID of a tunnel configured between nodes within a network. It is set up for each section in the unit of each bearer of the UE.

NodeB: It is installed outdoors as a base station of the UMTS network, and the size of the cell coverage corresponds to a macro cell.

eNodeB: It is installed outdoors as a base station of the Evolved Packet Core (EPC) network, and the size of the cell coverage corresponds to a macro cell.

(e)NodeB: It is a term indicating both NodeB and eNodeB.

Home NodeB: It is installed indoors as a base station of the UMTS network, and the size of the cell coverage corresponds to a femto cell.

Home eNodeB: It is installed indoors as a base station of the EPS network, and the size of the cell coverage corresponds to a femto cell.

Home (e)NodeB: It is a term indicating both Home NodeB and Home eNodeB.

MME: It is an abbreviation of Mobility Management Entity, and performs a role of controlling each entity within EPS to provide a session and mobility for the UE.

Selected IP Traffic Offload (SIPTO): Technology for offloading traffic to a wired network such as the Internet or the like, without using a network (e.g., 3GPP and 3GPP2) of the mobile communication operator when the UE transmits specific IP traffic through Home (e)NodeB or (e)NodeB.

Session: A session is a path for transmitting data, and the unit thereof may be PDN, bearer, IP flow, and the like. The difference between each unit may be classified with an object network overall unit (APN or PDN unit), a unit (bearer unit) classified with QoS within the unit, and a destination IP address unit.

PDN connection: A connection from a terminal to a PDN. That is, an association (connection) between a terminal represented by an IP address and a PDN represented by an APN. It denotes a connection between entities (terminal and PDN GW) in a core network to form a session.

UE Context: Situation information of the UE used to manage the UE in a network, namely, situation information configured with a UE id, mobility (current location, etc.), and an attribute of the session (QoS, priority, etc.).

OMA DM (Open Mobile Alliance Device Management): A protocol designed for the management of mobile devices such as a cellular phone, a PDA, a portable computer, etc. which performs the functions like configuration, firmware upgrade, and error report.

OAM (Operation Administration and Maintenance): A group of network management functions that provide network fault indication, performance information, and data and diagnosis functions.

NAS (Non-Access-Stratum): The highest stratum of the control plane between a UE and an MME. It supports mobility management, session management, and IP address maintenance between a UE and a network.

NAS configuration MO (Management Object): An MO (Management Object) used to configure parameters related to NAS functionality for a UE.

NAS level congestion control: A congestion control function of an EPS network, which contains the functions: "APN based congestion control" and "General NAS level Mobility Management.

MTC: Machine Type Communication. It occurs between machines without human interference.

MTC device: A UE that performs a specific object with a communication function over a core network. Example) A vending machine and a meter reading machine.

MTC server: A server on a network that manages an MTC device and sends and receives data to and from the MTC device.

MTC Application: An actual application (remote meter reading, tracking transport of goods, etc.) which uses an MTC device and an MTC server.

MTC Feature: Some features are required according to the functions or attributes of a network for supporting an MTC application, that is, according to the purpose of each application. Examples of which include MTC monitoring (required for remote meter reading prepared for equipment loss), low mobility (rare mobility for vending machines).

Figure 7:
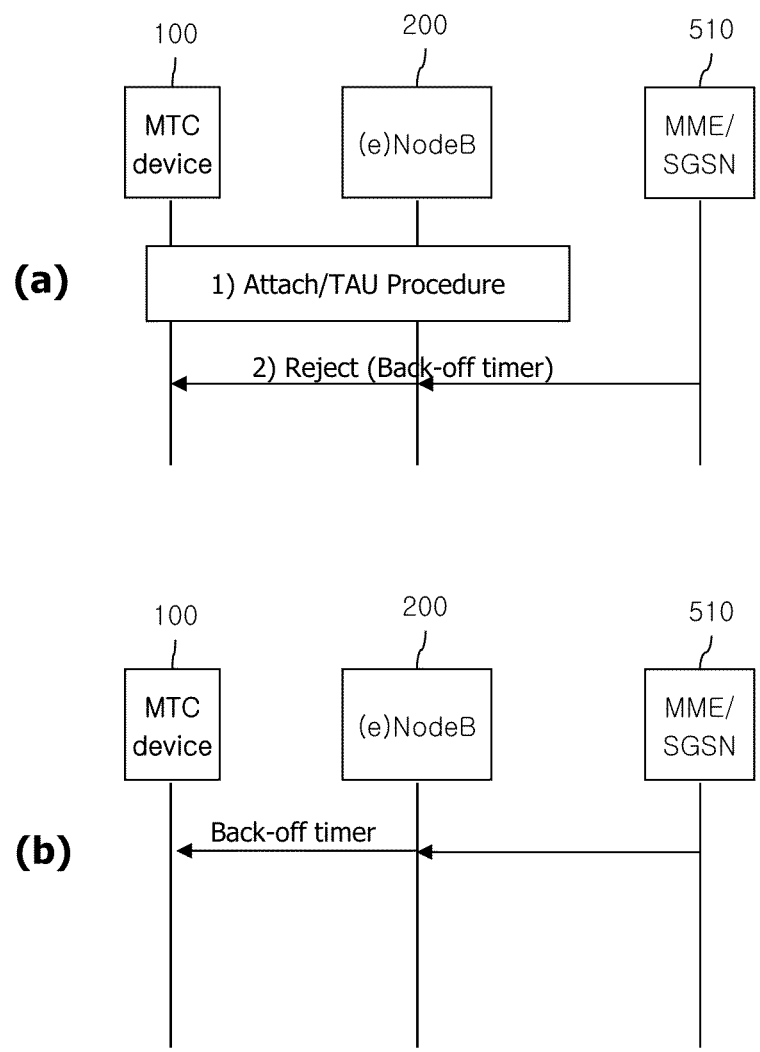
FIG. 7 shows a procedure of rejecting access from a MTC device in case of network congestion or overload.
Figure 8:
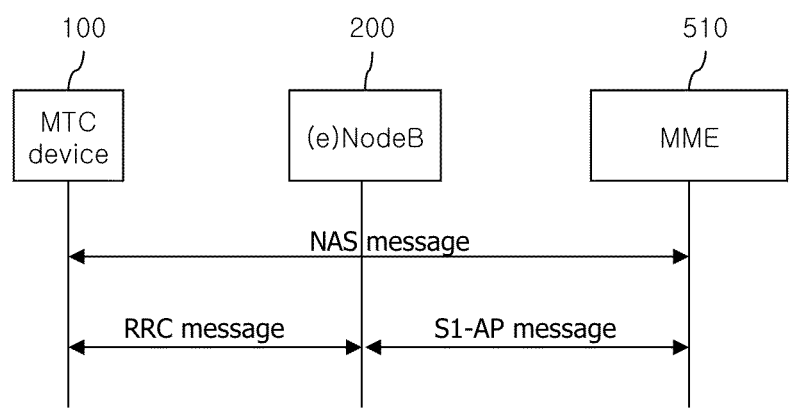
FIG. 8 is an exemplary view illustrating a protocol of the message illustrated in FIG. 7.

FIG. 7 shows a procedure of rejecting access from a MTC device in case of network congestion or overload. FIG. 8 is an exemplary view illustrating a protocol of the message illustrated in FIG. 7.

Prior to specifically describing each procedure with reference to FIG. 7, messages illustrated in FIG. 7 will be briefly described as follows with reference to FIG. 8.

The messages transmitted or received between the MTC device 100 and the (e)NodeB 200 are based on the Radio Resource Control (RRC) protocol. The messages transmitted or received between the (e)NodeB 200 and the MME 510 SGSN (not shown) are based the S1 Application Protocol (S1-AP).

The messages transmitted or received between the MTC device 100 and the MME 510 or SGSN (not shown) are based on the Non-Access Stratum (NAS) protocol. The messages based on the NAS protocol are encapsulated in a message based on the RRC protocol and the S1-AP message and then transmitted.

As can be seen with reference to FIG. 7(a), a network node can reject a specific access in order to resolve network congestion or overload. Such an access restriction is enabled according to an APN (i.e., congested APN) or MTC group. Such access restriction may cause the network node to transmit a back-off time to the MTC device and provide information about restricting access and session setup until the duration of the back-off time expires.

The network node may set the back-off time by using a randomization method. Also, the access start time is randomized to prevent simultaneous congestion at a specific point of time.

As can be seen with reference to FIG. 7(a), when the MTC device 100 performs an attach or tracking area update (TAU) procedure through a (e)NodeB 200 in case of network congestion or overload, a node, e.g., MME/SGSN 510, within the network rejects the attach, service request or TAU request according to a network situation such as an operator policy.

Also, the MME/SGSN 510 may transmit a back-off time when it performs the rejection so that the MTC device 100 does not have to attempt access until expiry of the back-off time.

At this point, the MTC device 100 does not have to perform an attach, service request or TAU procedure through a second (e)Node 220 based on the back-off time.

Alternatively, as shown in FIG. 7(b), in case of network congestion or overload, a node, e.g., MME/SGSN 510, within the network may transmit a back-off time to the MTC device 100 through the (e) nodeB 200 according to a network situation such as an operator policy.

Then, the MTC device 100 does not have to perform an attach, service request or TAU procedure through the second (e)Node 220 based on the back-off time.

As described above, when network congestion occurs in a 3GPP MTC network, a node (MME, Serving GW, PDN-GW, MSC, SGSN, and GGSN) of a core network performs NAS level congestion control to avoid or control signaling congestion.

The NAS level congestion control contains the functions: "APN based congestion control" and "General NAS level Mobility Management.

The APN based congestion control refers to (E)MM and (E)SM signaling congestion control related to a specific APN (APN associated with a congestion state), and contains APN based Session Management congestion control and APN based Mobility Management congestion control.

On the other hand, the General NAS level Mobility Management refers to avoiding congestion or overload by a node (MME, Serving GW, PDN-GW, MSC, SGSN, GGSN)'s rejecting a Mobility Management signaling request made by the MTC device (or UE or MS) in a situation of general network congestion or overload.

In general, in the case that a core network performs NAS level congestion control, a back-off timer (Or extended wait timer from lower layer) value is carried in a reject message and transmitted to the MTC device (or UE or MS) 100. The MTC device (or UE or MS) 100 does not send an (E)MM/(E)SM signaling request to the network until the back-off timer expires.

The back-off timer may be classified into a Mobility Management (MM) back-off timer for controlling (E)MM signaling (e.g., Attach, TAU/RAU, service requests, etc.) and a Session Management (SM) back-off timer for controlling (E)SM signaling (e.g., PDN connectivity, Bearer Resource Allocation, Bearer Modification, PDP Context Activation, PDP Context Modification requests, etc.). The MM back-off timer operates per UE, and the SM back-off timer operates per APN and per UE, respectively.

To sum up, the MM (Mobility Management) back-off timer is a Mobility Management-related back-off timer used for controlling network congestion, which is a timer that prevents the MTC device (or UE or MS) 100 from making attach, TAU/RAU, and service requests during the operation of the timer. However, in case of emergency bearer service or MPS (Multimedia Priority Service), the MTC device (or UE or MS) 100 may make a request even if the timer is running.

The MM back-off timer value may be provided from a network (e.g., MME, SGSN, HSS, etc.) or transmitted from lower layers (Access Stratum). Also, it may be set randomly in the range of basic values between 15 to 30 minutes.

The SM (Session Management) back-off timer is a Session Management-related back-off timer used for controlling network congestion, which is a timer that prevents the MTC device (or UE or MS) 100 from setting up or changing an associated APN-based session during the operation of the timer. However, in case of emergency bearer service or MPS (Multimedia Priority Service), the MTC device (or UE or MS) 100 may make a request even if the timer is running.

The SM back-off timer value may be provided from a network (e.g., MME, SGSN, HSS, etc.), or set randomly within up to 72 hours if the ESM/SM reject cause value is #26 (Insufficient resources).

As described above, when an MM/SM back-off timer value is provided from a network, the network operator sets the corresponding back-off value. MM/SM back-off timer values ranging from several tens of minutes to several hours are set according to a network situation and policy.

Meanwhile, if the MTC device (or UE or MS) 100 is a service user with high priority (multimedia priority service; users having access classes 11-15 and accessing a network), or already has emergency bearer services or wants to initiate them, the relevant service request may be made even if the MM/SM back-off timer is already running.

Generally, most MTC devices (or UE or MS) 100 are configured with a low priority. However, for MTC device which has to transmit data in a specific period, it is suggested to allow the MTC device to have dual priorities, i.e., a low priority and a normal priority (here a normal priority is called as "a override low priority"). Such MTC device having dual priorities can operate in a low priority and then change from being operated in the low priority to being operated in the normal priority (i.e., a override low priority) thereby to transmit the data.

Figure 9:
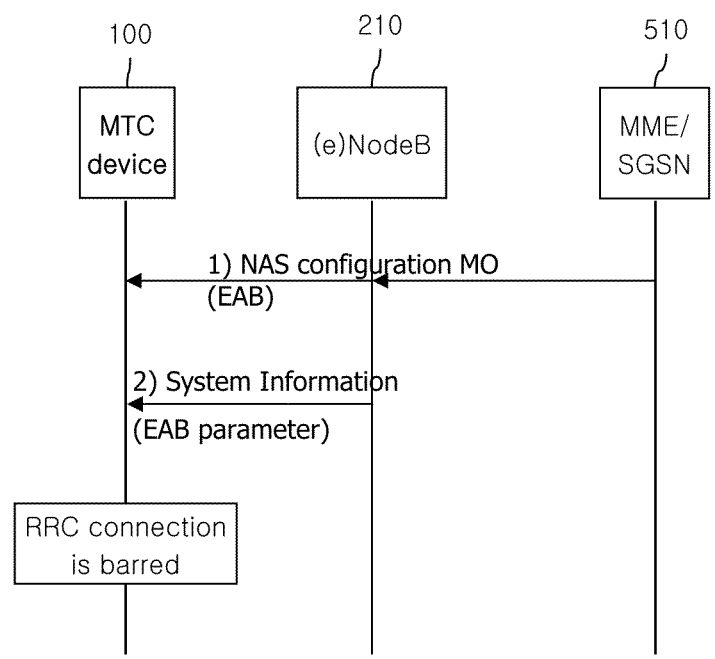
FIG. 9 shows a procedure of barring a RRC connection in case of network congestion or overload.

FIG. 9 shows a procedure of barring a RRC connection in case of network congestion or overload.

An Extended Access Barring (EAB) was also suggested in order to handle a congestion or overload in a network. If the MTC device is configured with EAB, then the MTC device cannot connect to the network. That is, the EAB bars the MTC device from connecting to the network.

To configure the EAB in the MTC device 100, the MME may transmit a NAS configuration MO including the EAB. The EAB in the NAS configuration MO has a bit value. Bit 0 indicates the extended access barring is not applied for the UE. Bit 1 indicates that the extended access barring is applied for the UE.

Also, to configure the EAB in the MTC device 100, the (e)NodeB 200 broadcasts system information including EAB parameters.

The following table 1 shows the EAB parameters.

TABLE 1

EAB parameters

| |
|---|
| eab-BarringBitmap |
| Extended access class barring for AC 0-9. The first/leftmost bit is for AC 0, the second bit is for AC 1, and so on |
| eab-Category |
| Indicates the category of UEs for which EAB applies. Value a corresponds to all UEs, value b corresponds to the UEs that are neither in their HPLMN nor in a Public Land Mobile Network (PLMN) that is equivalent to it, and value c corresponds to the UEs that are neither in the PLMN listed as most preferred PLMN of the country where the UEs are roaming in the operator-defined PLMN selector list on the USIM, nor in their HPLMN nor in a PLMN that is equivalent to their HPLMN |
| eab-Common |
| The EAB parameters applicable for all PLMN(s). |
| eab-PerPLMN-List |
| The EAB parameters per PLMN, listed in the same order as the PLMN(s) occur in plmn-IdentityList. |

After receiving the EAB and the EAB parameters, the MTC device determines whether the EAB is applied to itself based on the received them.

If the EAB is applied, the MTC device cannot establish the RRC connection with the (e)NodeB 200

In general, if the MTC device may be configured with a low priority, the MTC device may also be configured with the EAB. But, even if both the low priority and the EAB are configured to the MTC device, whether to actually apply the EAB to the MTC device may depend on subscribe data or operator's policies.

However, if the MTC device is still applied with the EAB even after the MTC device has changed from being operated in the low priority to being operated in the normal priority to transmit data, the MTC device cannot connect to the network.

Therefore, similarly to the concept of the override low priority, an override EAB was also suggested. The override EAB can be signaled by the NAS configuration MO to the MTC device. If the MTC device is configured with the override EAB and if the MTC device has a data to be transmitted, then the MTC device can override (or, ignore) the EAB and transmit the data.

As explained above, if the MTC device is configured with the dual priorities, the MTC device can change from/to being operated in the low priority to/from being operated in the normal priority (i.e., the override low priority). However, once the MTC device is configured with the override EAB, the MTC device always override (or, ignore) the EAB and then transmit the data at any time. This attenuates the original purpose for introducing the EAB. Thus, the congestion or overload in the network may be remained in an unsolved matter.

Accordingly, the disclosure of the present application provides some embodiments to solve the problem. In particular, the disclosure of the present application suggests ways to how to efficiently apply the override EAB to the MTC device.

Figure 10:
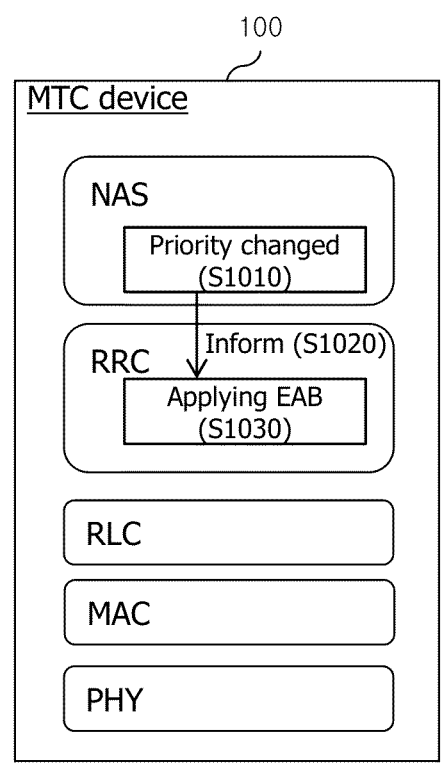
FIG. 10 shows one example method according to a first embodiment.

FIG. 10 shows one example method according to a first embodiment.

The MTC device 100 shown in FIG. 10 may support dual priorities and operated in an override low priority.

The MTC device then changes from being operated in the override low priority to being operated in the low priority according to a behavior of an application or a request from a network. The behavior of the application may mean a termination of data transmission for the override priority.

The NAS layer of the MTC device 100 can cognize that the priority has been changed (S1010). And if the NAS layer of the MTC device 100 also cognizes that an Attach request, a TAU request or a service request is being prepared to be transmitted, then the NAS layer of the MTC device 100 inform the lower layer, i.e., the RRC layer that it is required to apply the EAB (S1020). Alternatively, as soon as the NAS layer cognizes that the priority is changed, the NAS layer immediately informs the lower layer, i.e., the RRC layer that it is required to apply the EAB.

The lower layer, i.e., the RRC layer applies the EAB thereby to handle the request such as the Attach request, the TAU request or the service request (S1030).

So far, it has been explained above that the MTC device 100 supports the dual priorities. Otherwise, the MTC devices 100 may support multi priorities. And, it is noted that the method shown in FIG. 10 may be applicable to the MTC device which supports multi priorities.

Meanwhile, the first embodiment may be varied. For example, if the MTC device 100 is configured with the EAB, the NAS layer of the MTC device 100 or an EPS Mobility Management (EMM) indicates to the lower layer, i.e., the RRC layer of the MTC device 100 for the purpose of access control that EAB applies for each request except for the following four cases:

A first case is when the MTC device (or UE) 100 is accessing the network with one of the access classes 11-15.

A second case is when the MTC device (or UE) 100 is answering to paging;

A third case is when the RRC Establishment cause is set to "Emergency call"; or

A fourth case is when the MTC device (or UE) 100 is configured to allow overriding EAB and receives an indication from the upper layers, e.g. application layer to override EAB.

On the other hand, if the MTC device (or UE) 100 is not configured with the EAB and if it is required to establish a NAS-signaling connection, the MTC device (or UE) 100 selects an RRC establishment cause from a table 2 below. The NAS layer of the MTC device 100 or the EMM also indicates to the lower layer for the purpose of access control, the call type associated with the RRC establishment cause as specified in table 2.

TABLE 2

| NAS procedure | RRC establishment cause | Call type |
|---|---|---|
| Attach | If an ATTACH REQUEST has EPS attach type not set to "EPS emergency attach", the RRC establishment cause shall be set to MO signalling except when the UE initiates attach procedure to establish emergency bearer services. | "originating signalling" |
| | If an ATTACH REQUEST contains the Device properties IE with low priority indicator set to "UE is configured to NAS signalling low priority", the RRC establishment cause shall be set to Delay tolerant. | "originating signalling" |
| | If an ATTACH REQUEST has EPS attach type set to "EPS emergency attach" or if the ATTACH REQUEST has EPS attach type not set to "EPS emergency attach" but the UE initiates the attach procedure on receiving request from upper layer to establish emergency bearer services, the RRC establishment cause shall be set to Emergency call. | "emergency calls" |
| Tracking Area Update | If the UE does not have a PDN connection established for emergency bearer services and is not initiating a PDN CONNECTIVITY REQUEST that has request type set to "emergency, the RRC establishment cause shall be set to MO signalling. | "originating signalling" |
| | If a TRACKING AREA UPDATE REQUEST contains the Device properties IE with low priority indicator set to "UE is configured to NAS signalling low priority", the RRC establishment cause shall be set to Delay tolerant. | "originating signalling" |
| | If the UE has a PDN connection established for emergency bearer services or is initiating a PDN CONNECTIVITY REQUEST that has request type set to "emergency", the RRC establishment cause shall be set to Emergency call. | "emergency calls" |
| Detach | MO signalling | "originating signalling" |
| Service Request | If a SERVICE REQUEST is to request user plane radio resources, the RRC establishment cause shall be set to MO data. | "originating calls" |
| | If a SERVICE REQUEST is to request user plane radio resources for emergency bearer services, the RRC establishment cause shall be set to Emergency call. | "emergency calls" |
| | If a SERVICE REQUEST is to request resources for UL signalling, the RRC establishment cause shall be set to MO data. | "originating calls" |
| | If a SERVICE REQUEST is triggered by a PDN CONNECTIVITY REQUEST that has request type set to "emergency", the RRC establishment cause shall be set to Emergency call. | "emergency calls" |
| | If a SERVICE REQUEST is a response to paging where the CN domain indicator is set to "PS", the RRC establishment cause shall be set to MT access. | "terminating calls" |

TABLE 2-continued

| NAS procedure | RRC establishment cause | Call type |
|---|---|---|
| | If an EXTENDED SERVICE REQUEST has service type set to "packet services via S1" and is to request user plane radio resources for emergency bearer services, the RRC establishment cause shall be set to Emergency call. | "emergency calls" |
| | If an EXTENDED SERVICE REQUEST has service type set to "packet services via S1" and is triggered by a PDN CONNECTIVITY REQUEST that has request type set to "emergency", the RRC establishment cause shall be set to Emergency call. | "emergency calls" |
| | If an EXTENDED SERVICE REQUEST has service type set to "packet services via S1" and is a response to paging where the CN domain indicator is set to "PS", the RRC establishment cause shall be set to MT access. | "terminating calls" |
| | If an EXTENDED SERVICE REQUEST has service type set to "mobile originating CS fallback or 1xCS fallback" and is to request mobile originating 1xCS fallback, the RRC establishment cause shall be set to MO data. | "originating calls" |
| | If an EXTENDED SERVICE REQUEST has service type set to "mobile originating CS fallback or 1xCS fallback" and is to request mobile originating CS fallback, the RRC establishment cause shall be set to MO data. | "mobile originating CS fallback" |
| | If an EXTENDED SERVICE REQUEST is a response to paging for CS fallback, service type set to "mobile terminating CS fallback or 1xCS fallback", the RRC establishment cause shall be set to MT access | "terminating calls" |
| | If an EXTENDED SERVICE REQUEST has service type set to "mobile originating CS fallback emergency call or 1xCS fallback emergency call", the RRC establishment cause shall be set to Emergency call. | "emergency calls" |
| | If an EXTENDED SERVICE REQUEST contains the Device properties IE with low priority indicator set to "UE is configured to NAS signalling low priority", the RRC establishment cause shall be set to Delay tolerant. | "originating calls" |

Figure 11:
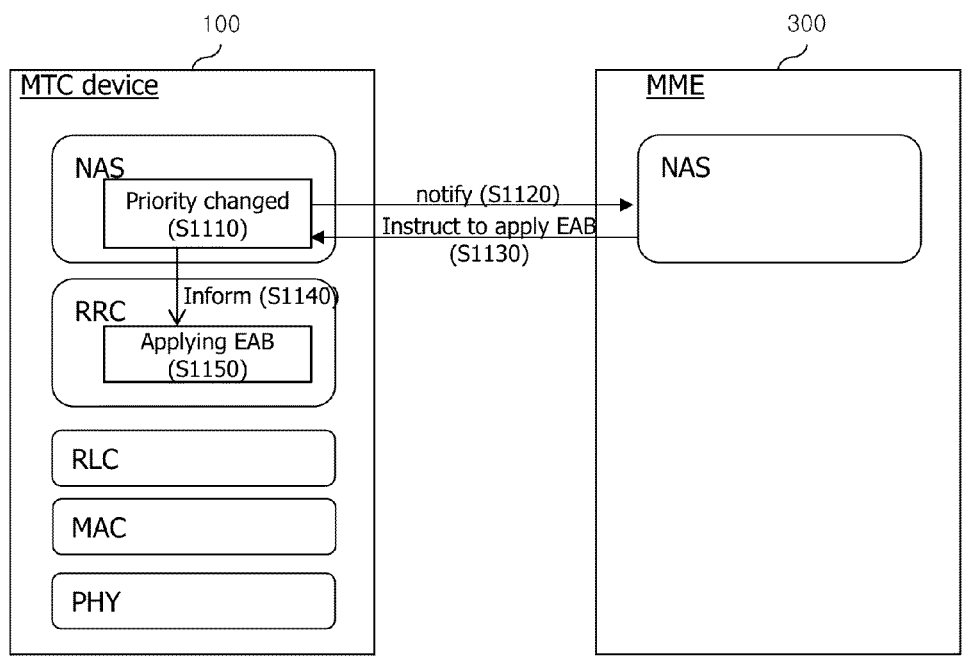
FIG. 11 shows one example method according to a second embodiment.

FIG. 11 shows one example method according to a second embodiment.

The MTC device 100 shown in FIG. 11 may support dual priorities and operated in an override low priority.

The MTC device then changes from being operated in the override low priority to being operated in the low priority according to a behavior of an application or a request from a network. The behavior of the application may mean a termination of data transmission for the override priority.

The NAS layer of the MTC device 100 can cognize that the priority has been changed (S1110). And the NAS layer of the MTC device 100 notifies a NAS layer of the MME 300 that the priority has been changed (S1120). The notification may be achieved by transmitting an Attach request, a TAU request or a service request to the MME 300.

The NAS layer of the MME 300 then instructs the MTC device 100 to apply the EAB in response to the change of the priority or to withdraw an appliance of the override EAB (S1130). The instruction may be delivered by transmitting a reject message in response to the Attach request, the TAU request or the service request, or by transmitting a dedicated message.

Then, the NAS layer of the MTC device 100 informs the lower layer, i.e., the RRC layer that it is required to apply the EAB (S1140).

The lower layer, i.e., the RRC layer applies the EAB thereby to handle the request such as the Attach request, the TAU request or the service request (S1150).

So far, it has been explained above that the MTC device 100 supports the dual priorities. Otherwise, the MTC devices 100 may support multi priorities. And, it is noted that the method shown in FIG. 11 may be applicable to the MTC device which supports multi priorities.

Meanwhile, the first and second embodiments may be varied.

For example, if the MTC device 100 is configured with the EAB, the MTC device 100 always applies the EAB to itself regardless of which priority the MTC device is operated in. Alternatively, if the MTC device 100 is configured with the override EAB, the MTC device 100 always override (or ignore) the EAB regardless of which priority the MTC device is operated in. Also, although the MTC device 100 is configured with the EAB or the override EAB, each application of the MTC device 100 may decides whether to apply the EAB regardless of which priority the MTC device is operated in. For this decision, the application may consider the operator's policy and etc.

Figure 12:
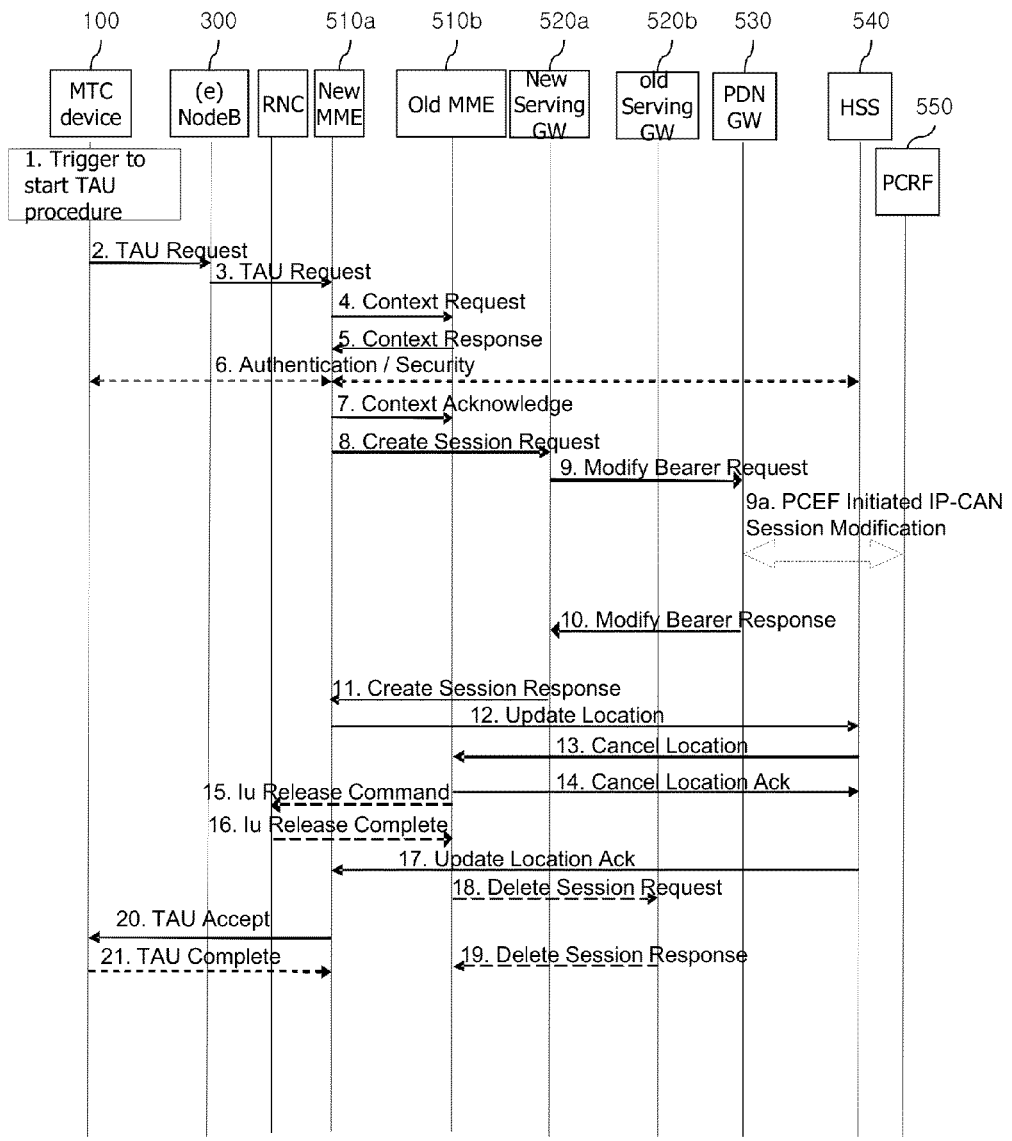
FIG. 12 shows one example method according to a third embodiment.

FIG. 12 shows one example method according to a third embodiment.

As shown in FIG. 12, if the MTC device 100 tries to perform a TAU procedure, the new MME 510a decides whether to apply the EAB to the MTC device 100. On decision, the new MME 510a may consider a subscription data and/or an operator's policy/preference. The operator's policy/preference may be obtained from a PCRF 550 at step 9a. And, the subscription data may be obtained from a HSS 540 at step 17.

In more detail, the TAU procedure will be explained with reference to FIG. 12.

1~3) The MTC device 100 decides to start the TAU procedure, and then transmit a TAU request message to (e)NodeB 300. The (e)NodeB 300 delivers the TAU request message to the new MME 510a.

4~5) The new MME 510a transmits a Context Request message to a old MME 510b. The old MME 510b transmits a Context Response message including information related to the MTC device to the new MME 510a.

6) A procedure for authentication or security is performed between the MTC device 100 and the HSS 540.

7) The new MME 510a transmits a Context Acknowledge message in response to the reception of the Context Response message.

8) Meanwhile, the new MME 510a transmits a Create Session Request message to a new Serving Gateway (S-GW) 520a.

9) The new S-GW 520a transmits a Modify Bearer Request message to PDN gateway (PDN GW) 530.

9a) The PDN GW 530 executes a session modification procedure, for example, a PCEF-initiated IP-CAN Session Modification procedure, with the PCRF 550. The PCRF 550 is a node in an EPS network which makes a policy decision to dynamically apply different QoS and charging policies for each service flow, and handles a charging process according to the Session Termination Procedure.

At this point, the P-GW 530 acquires policy information from the PCRF 540. Specifically, the PDN GW 530 obtains operator policy/preference through the PCRF. It is noted that the operator's policy/preference includes information on applicability of the EAB according to dual priorities or multi priorities.

10~11) Then, the PDN GW 530 transmits a Modify Bearer Response message including the operator's policy/preference to the new S-GW 520a to serve the MTC device 100, and the new S-GW 520a transmits a Create Session Response including the operator's policy/preference to the new MME 510a to serve the MTC device 100.

12~14) The new MME 510a transmits a Update Location message to the HSS 540. Then, the HSS 540 transmits a Cancel location message to the old MME 510b and the old MME 510b transmits a Cancel Location Acknowledge message to the HSS 540.

15~16) The old MME 510b may selectively transmit a Iu Release command for instructing a RNC to lease a Iu interface and receive a Iu
Release Complete message from the RNC.

17) Meanwhile, the HSS 540 transmits a Update Location Acknowledge message including a subscription data related to the MTC device 100 to the New MME 510a. It is noted that the subscription data may include information on applicability of the EAB according to dual priorities or multi priorities.

18~19) The old MME 510b transmits a Delete Session Request message to the old S-GW 520b and the old S-GW 520b transmits a Delete Session Response message to the old MME 510b.

20~21) The new MME 510a decides whether to apply the EAB to the MTC device 100 based on at least one of the acquired subscription data and the acquired operator's policy/preference which may include information on applicability of the EAB according to dual priorities or multi priorities.

So far, it has been explained that when the new MME 510a decides whether to accept or reject the TAU request from the MTC device 100, the new MME 510a may consider a subscription data and/or an operator's policy/preference to decide whether to apply the EAB to the MTC device 100. This concept may also be applicable when the new MME 510 decides whether to accept or reject an Attach request from the MTC device 100.

Figure 13:
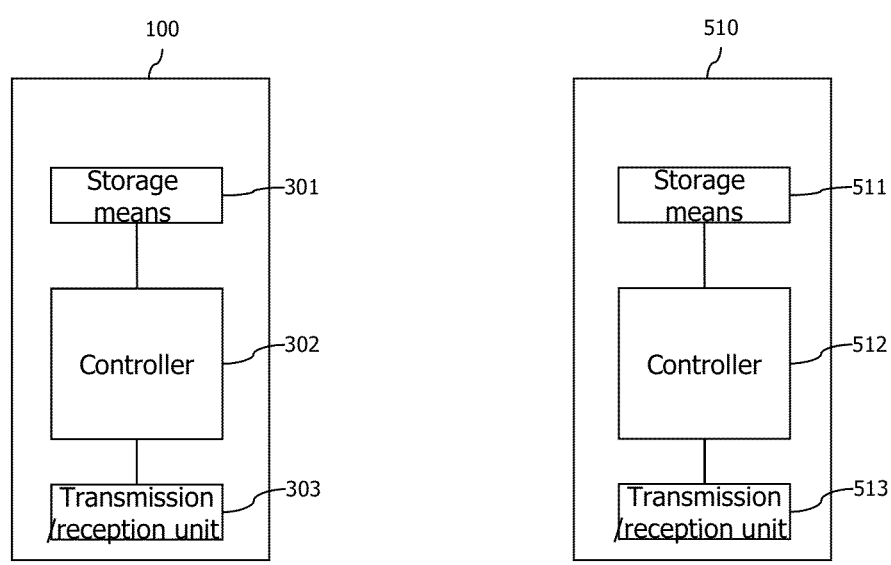
FIG. 13 is a block diagram of the MTC device and MME according to the present invention.

FIG. 13 is a block diagram of the MTC device (or UE) and MME according to the present invention.

As shown in FIG. 13, the MTC device (or UE) 100 includes storage means 101, a controller 102, and a transmission/reception unit (or a radio frequency (RF) unit) 103. The MME 510 includes storage means 511, a controller 512, and a transmission/reception unit (or a RF unit) 513.

The storage means 101 and 511 stores the methods illustrated in FIGS. 7 through 12.

The controllers 102 and 512 control the storage means 101 and 511 and the transmission/reception units 103 and 513. Specifically, the controllers 102 and 512 execute the methods stored in the storage means 101 and 511, respectively. The controllers 102 and 512 transmit the above-mentioned signals through the transmission/reception units 103 and 513.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for applying an extended access barring (EAB), the method performed by a machine type communication (MTC) device, the method comprising:
receiving, by the MTC device set to override a low priority, a non-access stratum (NAS) configuration Management Object (MO) including EAB information; and
determining whether to apply the EAB based on the EAB information and a setting related to the low priority, to handle at least one of an attach request, a tracking area update request, and a service request;
if the EAB is applied, except for satisfying a plurality of conditions, including a first condition specifying if the MTC device is configured to allow overriding EAB, a second condition specifying if the MTC device is set to override the low priority, and a third condition specifying if the MTC device receives an indication from an upper layer to override EAB, then indicating to a lower layer that the EAB applies for at least one of the attach request, the tracking area update request, and the service request,
wherein it is determined that the EAB is applied if the setting is changed to the low priority from overriding the low priority, and
wherein, if the EAB is applied, a radio resource control (RRC) connection is barred.

2. The method of claim 1, further comprising:
receiving system information including at least one EAB parameter,
wherein the system information is broadcasted within a cell, and
wherein the at least one EAB parameter is taken into account when determining whether to apply the EAB.

3. The method of claim 2, wherein the EAB parameter includes at least one of:
a bitmap parameter indicating classes for which access is barred;
a category parameter indicating a category of devices for which the EAB applies; and
a list of Public Land Mobile Network (PLMN).

4. The method of claim 1, further comprising:
notifying a NAS layer of a network node that the priority has been changed; and
receiving an instruction to apply the EAB from the NAS layer of the network node.

5. The method of claim 1, wherein:
the upper layer corresponds to a NAS layer; and
the lower layer corresponds to a RRC layer.

6. A machine type communication (MTC) device for applying an extended access barring (EAB), the MTC device comprising:
a radio frequency (RF) unit configured to receive a non-access stratum (NAS) configuration Management Object (MO) including the EAB information;

a processor configured to:
  override a low priority;
  determine whether to apply the EAB based on the EAB information and a setting related to the low priority, to handle at least one of an attach request, a tracking area update request, and a service request; and
  if the EAB is applied, except for satisfying a plurality of conditions, including a first condition specifying if the MTC device is configured to allow overriding EAB, a second condition specifying if the MTC device is set to override the low priority, and a third condition specifying if the MTC device receives an indication from an upper layer to override EAB, then indicate to a lower layer that the EAB applies for at least one of the attach request, the tracking area update request, and the service request,
wherein it is determined that the EAB is applied if the setting is changed to the low priority from overriding the low priority, and
wherein, if the EAB is applied, a radio resource control (RRC) connection is barred.

7. The MTC device of claim 6, wherein:
  the RF unit is further configured to receive system information including at least one EAB parameter; and
  the system information is broadcasted within a cell.

8. The method of claim 7, wherein the EAB parameter includes at least one of:
  a bitmap parameter indicating classes for which access is barred;
  a category parameter indicating a category of devices for which the EAB applies; and
  a list of Public Land Mobile Network (PLMN).

9. The method of claim 6, wherein the processor is further configured to:
  notify a NAS layer of a network node that the priority has been changed; and
  receive an instruction to apply the EAB from the NAS layer of the network node.

10. The method of claim 6, wherein:
  the upper layer corresponds to a NAS layer; and
  the lower layer corresponds to a RRC layer.

* * * * *